(12) United States Patent
Yang

(10) Patent No.: US 11,057,363 B2
(45) Date of Patent: Jul. 6, 2021

(54) TRUSTED LOGIN OF USER ACCOUNTS

(71) Applicant: Advanced New Technologies Co., Ltd., Grand Cayman (KY)

(72) Inventor: Wenxue Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 380 days.

(21) Appl. No.: 15/885,234

(22) Filed: Jan. 31, 2018

(65) Prior Publication Data
US 2018/0227290 A1 Aug. 9, 2018

(30) Foreign Application Priority Data
Feb. 9, 2017 (CN) .......................... 201710071568.6

(51) Int. Cl.
*H04L 29/06* (2006.01)
*H04L 9/32* (2006.01)
(Continued)

(52) U.S. Cl.
CPC .......... *H04L 63/0807* (2013.01); *G06F 21/41* (2013.01); *H04L 9/3073* (2013.01);
(Continued)

(58) Field of Classification Search
CPC . H04L 63/0807; H04L 63/0815; H04L 63/10; H04L 63/0846; H04L 9/3073; H04L 9/3213; H04L 9/3228; G06F 21/41
See application file for complete search history.

(56) References Cited

U.S. PATENT DOCUMENTS 5,210,795 A 5/1993 Lipner et al.
8,595,494 B2 * 11/2013 Monjas Llorente .. H04L 63/102
713/168
(Continued)

FOREIGN PATENT DOCUMENTS

CN 105897663 8/2016
CN 104580496 4/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Daniel B Potratz
*Assistant Examiner* — Wansik You
(74) *Attorney, Agent, or Firm* — Fish & Richardson P.C.

(57) ABSTRACT

Technologies related to trusted user account login are disclosed. In one implementation, a temporary trusted login token request for accessing a service page from an originating application is received. A temporary trusted login token based on the temporary trusted login token request is generated. The temporary trusted login token is sent to the originating application. A service page access request is received for accessing the service page generated based on the temporary trusted login token. The temporary trusted login token including the service authorization from the service page access request is identified. Whether the service page is included in the one or more service pages that are identified by the service authorization is determined, and trusted login to the service page from the originating application is allowed if the service page is included in the one or more service pages.

14 Claims, 6 Drawing Sheets

(51) Int. Cl.
*H04L 9/30* (2006.01)
*G06F 21/41* (2013.01)

(52) U.S. Cl.
CPC .......... *H04L 9/3213* (2013.01); *H04L 9/3228* (2013.01); *H04L 63/0815* (2013.01); *H04L 63/10* (2013.01)

(56) References Cited

U.S. PATENT DOCUMENTS

| | | |
|---|---|---|
| 9,531,719 B1 * | 12/2016 | Sutton .................... H04L 63/10 |
| 2005/0108551 A1 | 5/2005 | Toomey |
| 2010/0058064 A1 | 3/2010 | Kirovski et al. |
| 2012/0204221 A1 | 8/2012 | Monjas Llorente et al. |
| 2013/0086645 A1 | 4/2013 | Srinivasan et al. |
| 2013/0219479 A1 | 8/2013 | DeSoto et al. |
| 2014/0025753 A1 | 1/2014 | Gronowski et al. |
| 2014/0282940 A1 | 9/2014 | Williams et al. |

FOREIGN PATENT DOCUMENTS

| | | |
|---|---|---|
| EP | 2491694 | 8/2012 |
| JP | 2013508831 | 3/2013 |
| JP | 2016018529 | 2/2016 |
| TW | 201644293 | 12/2016 |
| WO | WO 2013145517 | 10/2013 |

OTHER PUBLICATIONS

Nakamoto, "Bitcoin: A Peer-to-Peer Electronic Cash System," www.bitcoin.org, 2005, 9 pages.

International Preliminary Report on Patentability in International Application No. PCT/US2018/017657, dated Jan. 15, 2019, 22 pages.

PCT International Search Report and Written Opinion in International Application No. PCT/US2018/017657, dated Apr. 5, 2018, 12 pages.

Extended Search Report in European Application No. 20186974.0, dated Oct. 6, 2020, 9 pages.

* cited by examiner

US 11,057,363 B2

TRUSTED LOGIN OF USER ACCOUNTS

This application claims priority to Chinese Patent Application No. 201710071568.6, filed on Feb. 9, 2017, which is incorporated by reference in its entirety.

TECHNICAL FIELD

This disclosure relates to user account security, more particularly, to trusted user account login.

BACKGROUND

An increasing number of software and applications are developed for user computing devices including personal computer (PC), APPLE MACINTOSH, and mobile devices. Most software and applications require a user to input user name and password for account login.

In some cases, after a user logs in to a user account for an application A, the login information can be used to automatically log in to an application B that trusts application A. The automatic login to application B is based on its trusted relationship with application A, and is sometimes referred to as a trusted login. In some cases, application A can perform functionalities using services provided by application B after the trusted login.

When a user performs a trusted login to application B from application A, application B first provides application A with trusted login information (for example, a number). Application A writes the security login information provided by the user and the trusted login information provided by application B to a login request, encrypts the login request using an encryption key and sends the security information to application B. Application B uses a public key to decrypt the login request and to check whether the trusted login number is legitimate. If so, application B allows the user access from application A. However, if application A is hacked, the trusted login information can be used by an authorized user to log in to application B, even if application B has a more restrictive security requirement.

SUMMARY

The present disclosure describes methods and systems, including computer-implemented methods, computer program products, and computer systems for securely performing trusted user account login.

In an implementation, a temporary trusted login token request for accessing a service page from an originating application is received. A temporary trusted login token based on the temporary trusted login token request is generated, wherein the temporary trusted login token includes a service authorization that identifies one or more service pages that can be accessed through temporary trusted login. The temporary trusted login token is sent to the originating application. A service page access request is received for accessing the service page generated based on the temporary trusted login token. The temporary trusted login token including the service authorization from the service page access request is identified. Whether the service page is included in the one or more service pages that are identified by the service authorization is determined, and trusted login to the service page from the originating application is allowed if the service page is included in the one or more service pages.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, by issuing a temporary trusted login token, a first server can use a service authorization to provide limited access from an originating application to a service page of a target application without performing additional login steps. Second, the limited access allowed by the service authorization can protect unauthorized service pages from being accessed using trusted login, which improves data security. Third, by returning service pages to the originating application after a trusted login, a trusted user does not need to be redirected to the target application to perform the service, improving the user's experience.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes a method for trusted login to multiple user computing device applications, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

At a high-level, a trusted login system for performing trusted login can include two application subsystems. An originating application subsystem includes a second server and an originating application that a user operates on. A target application subsystem includes a first server and a service page for a service provided by the first server that the user seeks for trusted login. An access entrance to the service page for the service provided by the first server is embedded in a user interface (UI) of the originating application. A user can perform trusted login to the service page by operating on the access entrance embedded in the UI of the originating application.

Figure 1:
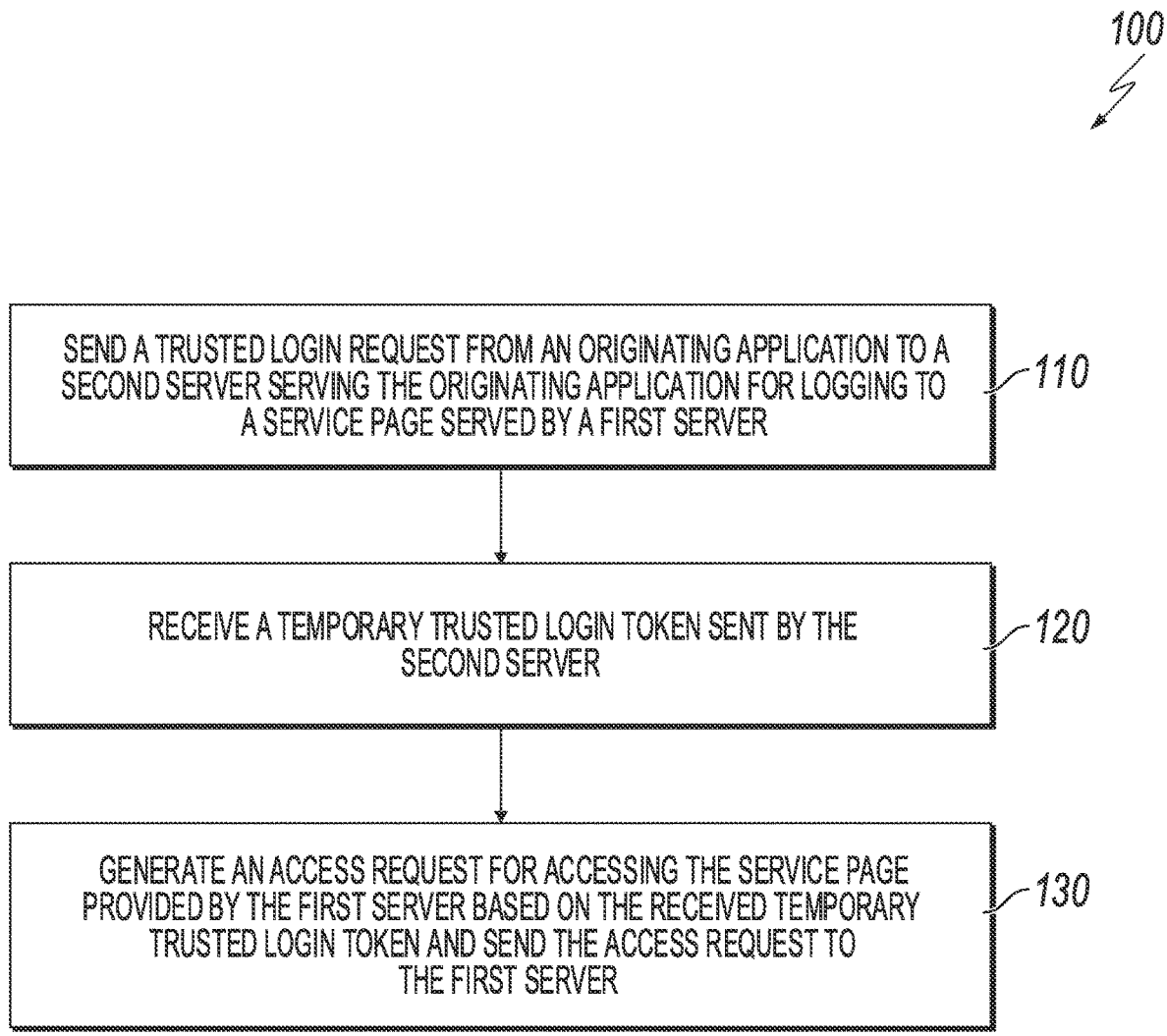
FIG. 1 is a flowchart illustrating an example of a method for trusted login to a service page from an originating application, according to an implementation of the present disclosure.

FIG. 1 is a flowchart illustrating an example method 100 for trusted login to a service page from an originating application, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, a trusted login request is sent from an originating application to a second server serving the originating application for logging to a service page served by a first server. In some cases, the trusted login request to a second server is sent in response to a user performing an operation on an access entrance on a UI of the originating application. The access entrance can be a hyperlink embedded in the UI. The service page can be included in a target application for services provided by the first server.

The trusted login request can include a service identification (ID) of the service page. The service ID can be unique to the service page to be accessed from the originating application. The trusted login request can also include a user ID and password. The user ID and password can be used to log in to the second server, or allow the second server to authenticate the user's identity for using the originating application. When the user successfully logs in from the originating application to the second server using the user ID and password, or the user's identity is otherwise verified by the second server, the second server can send a temporary trusted login token to the originating application. From 110, method 100 proceeds to 120.

At 120, the temporary trusted login token sent by the second server is received by the originating application. The temporary trusted login token can be a certificate for the originating application to visit the first server and access the service page served by the first server. A service authorization for accessing one or more service pages can be written in the temporary trusted login token. The originating application can be restricted from accessing service pages not allowed by the service authorization of the temporary trusted login token. The temporary trusted login token can be generated by the first server in response to a temporary trusted login token request from the second server and is sent back to the second server. The second server can then forward the temporary trusted login token to the originating application. From 120, method 100 proceeds to 130.

At 130, an access request for accessing the service page provided by the first server is generated based on the received temporary trusted login token and sent to the first server. During generation of the access request for accessing the service page, the access request can be generated based on the temporary trusted login token and the service ID. In some cases, the access request can also be generated based on the user ID. If the access request includes the user ID, the first server can search for, or generate, a user ID for user account login to the service page based on a predetermined user ID mapping relationship between the second server and the first server.

The originating application can then wait for the first server to return a service page to the UI of the originating application. Upon receiving the service page, the originating application can perform services provided by the service page. Because the service pages that can be accessed from the originating application are determined by the service authorization of the temporary trusted login token, the access permission to services provided by the service page can be customized to allow enhanced security. After 130, method 100 ends.

Figure 2:
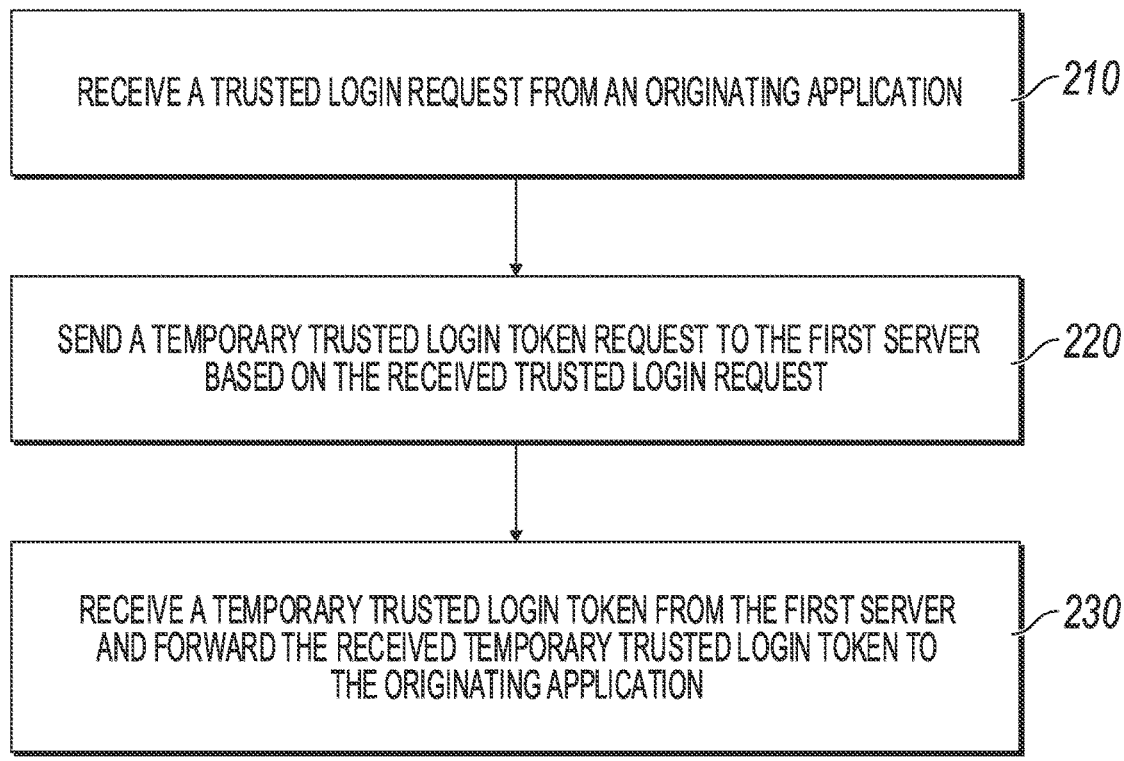
FIG. 2 is a flowchart illustrating an example of a method for trusted login to a service page served by a first server, according to an implementation of the present disclosure.

FIG. 2 is a flowchart illustrating an example method 200 for trusted login to a service page served by a second server, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 210, a trusted login request is received by a second server from an originating application. From 210, method 200 proceeds to 220.

At 220, a temporary trusted login token request based on the received trusted login request is sent to a first server. The temporary trusted login token request can be generated based on the trusted login request and a server ID of the second server. The first server can determine, based on the server ID, whether the second server is a trusted server. If the second server is a trusted server, the first server can parse the trusted login request included in the token acquisition request, and send a temporary login token to the second server. If the second server is not a trusted server, the first server can reject the token acquisition request.

The temporary trusted login token request can also be generated based on the trusted login request and a current trusted login ID issued by the first server. The current trusted login ID can be a certificate used by the second server to obtain a temporary trusted login token. If the current trusted login ID is legitimate, the first server can parse the trusted login request in the temporary trusted login token request to determine whether to send the temporary login token. If the current trusted login ID is not legitimate, the first server can reject to send the temporary login token to the second server.

The current trusted login ID can be a trusted login number. The trusted login number can be issued by the first server to the trusted second server. The trusted login number can be a permanent number, and can be valid within a predetermined time period. In some cases, the trusted login number can also be updated dynamically. The first server can update the trusted login number periodically and then send it to the second server.

In some cases, the second server can directly send the temporary trusted login token request to the first server after receiving a trusted login request from the originating application. In some other cases, the second server can parse the trusted login request to determine whether the trusted login request is legitimate (for example, determine whether the originating application has been used to successfully log in to the second server, or the first server providing the service page has e-signed an agreement with the second server). If the trusted login request is determined to be legitimate, the second server then sends the temporary trusted login token request to the first server. If the trusted login request is determined to be not legitimate, the second server can return a failure message to the originating application. From 220, method 200 proceeds to 230.

At 230, a temporary trusted login token is received from the first server and forwarded to the originating application. After 230, method 200 ends.

Figure 3:
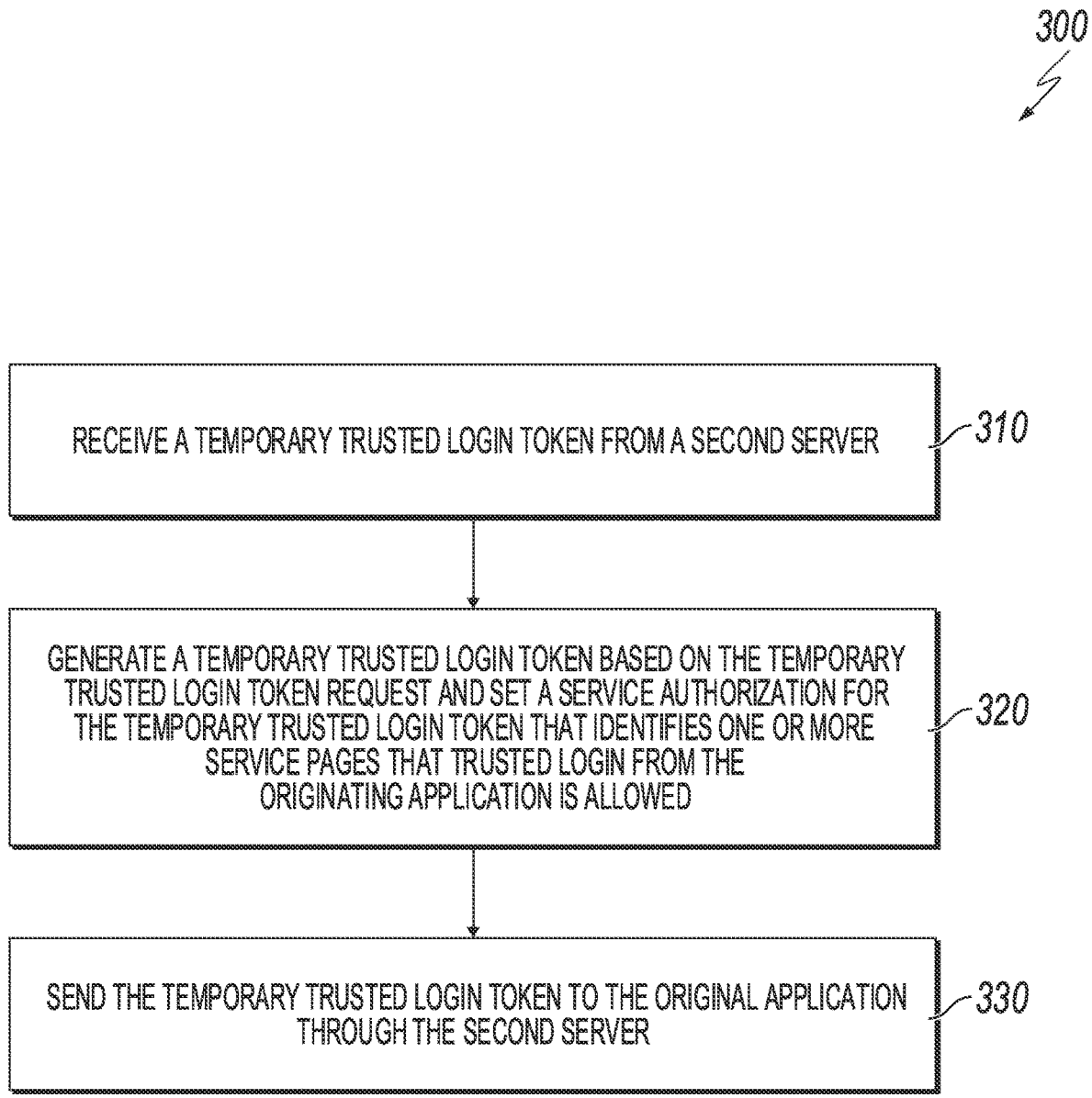
FIG. 3 is a flowchart illustrating an example of a method for handling a temporary trusted login token, according to an implementation of the present disclosure.

FIG. 3 is a flowchart illustrating an example method 300 for handling temporary trusted login token, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 310, a temporary trusted login token request is received by a first server from a second server. In some cases, after receiving the token acquisition request, the first server can generate a temporary trusted login token based on the temporary trusted login token request and set a service authorization of the temporary trusted login token that determines one or more service pages that trusted login can be allowed by accessing from the originating application. In some cases, the first server can first determine whether the originating application is a trusted client application based on the token acquisition request, before generating the temporary trusted login token.

In some cases, the first server can determine whether the originating application is a trusted client application based on whether the temporary trusted login token request includes a current trusted login ID issued by the first server to the second server. If so, it is determined that the originating application is a trusted client application. Otherwise, it is determined that the originating application is not a trusted client application.

In some cases, the first server can determine whether the originating application is a trusted client application based on user ID mapping between the second server and the first server. For example, a first server can identify a user ID of the originating application in the token acquisition request, and determine whether a corresponding user ID exists in the first server. If a corresponding user ID exists, it is determined that the originating application is a trusted client application. Otherwise, it is determined that the originating application is not a trusted client application. If it is determined that the originating application is not a trusted client application, the first server can return a failure message to the second server. Otherwise, the method 300 proceeds from 310 to 320.

At 320, a temporary trusted login token is generated based on the temporary trusted login token request and a service authorization is set for the temporary trusted login token that identifies one or more service pages that trusted login from the originating application is allowed. The service authorization can be set for one or more service pages. The setting of the service authorization can include establishing at least one of a first mapping relationship or a second mapping relationship. The first mapping relationship can be a mapping relationship between the temporary trusted login token and one or more service IDs corresponding to the one or more allowed service pages. The second mapping relationship can be a mapping relationship between the temporary trusted login token and a current trusted login ID issued to the second server. Because the current trusted login ID is associated with a server, by using the second mapping relationship, the temporary trusted login token can be directed to the second server. As such, the temporary trusted login token can be protected from unauthorized access by other servers. For example, in the mapping relationships shown in Table 1, a temporary trusted login token x1579 can only be issued to server Y1 corresponding to a current trusted login ID 4627, and cannot be issued to servers Y2 and Y3.

TABLE 1

| Temporary Trusted Login Token | Server | Service ID | Current Trusted Login ID |
|---|---|---|---|
| x1579 | Y1 | 101 | 4627 |
| y2641 | Y2 | 101 | 4786 |
| x6478 | Y3 | 103 | 3451 |

In some cases, the temporary trusted login token can be generated based on specific rules for authenticity check. In some cases, a time limit can be set for the temporary trusted login token, such that the temporary trusted login token expires after the time limit. From 320, method 300 proceeds to 330.

At 330, the temporary trusted login token can be sent to the original application through the second server. After 330, method 300 ends.

Figure 4:
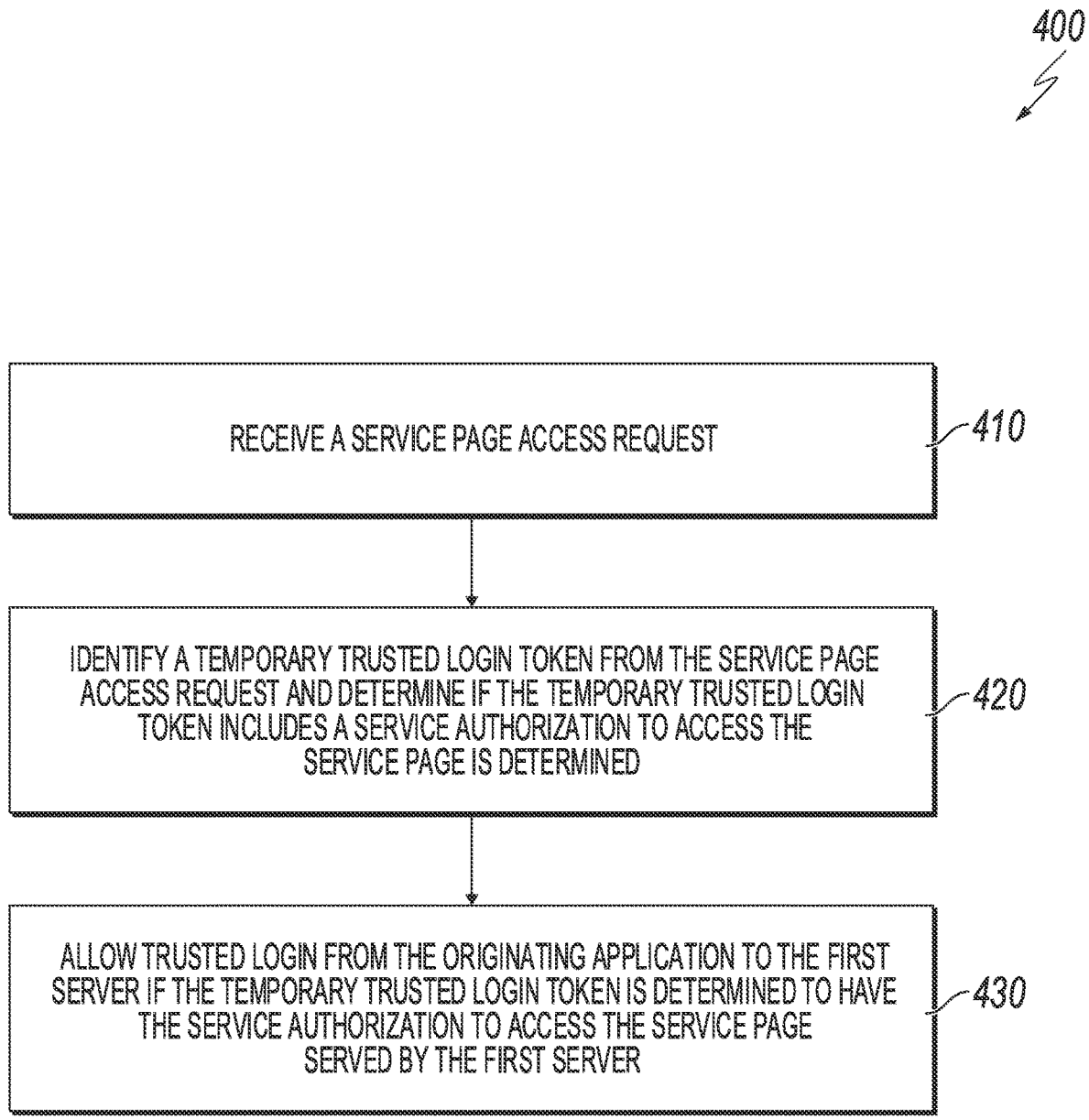
FIG. 4 is a flowchart illustrating an example of a method for verifying a temporary trusted login token, according to an implantation of the present disclosure.

FIG. 4 is a flowchart illustrating an example of a method 400 for verifying a temporary trusted login token, according to an implantation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 410, a service page access request sent from the originating application is received. From 410, method 400 proceeds to 420.

At 420, a temporary trusted login token is identified from the service page access request, and whether the temporary trusted login token includes a service authorization to access the service page is determined. In some cases, in order to improve information feedback efficiency of the first server, before determining whether the temporary trusted login token includes the service authorization, the first server can determine whether the temporary trusted login token is legitimate or unexpired, in order to improve information feedback efficiency of the first server. If it is determined that the temporary trusted login token is not legitimate or has expired, the service page access request can be rejected by the first server. If it is determined that the temporary trusted login token is legitimate and has not expired, the determination on the service authorization is then performed.

In some cases, whether the service page can be accessed based on the service authorization can be determined from a first mapping relationship between service IDs of the service pages and the temporary trusted login tokens. The first mapping relationship and the second mapping relationship are discussed in the description of 320 of FIG. 3. The service ID of the service page can be identified from the service page access request. If the service authorization can be parsed to identify a first mapping relationship between the temporary trusted login token and the service ID, the temporary trusted login token can have the service authorization to access the service page. Otherwise, the temporary trusted login token does not have the service authorization to access the service page.

In some cases, the first mapping relationship and the second mapping relationship are used to determine whether the service authorization can allow access to the requested service page. The second mapping relationship can be a mapping relationship between the temporary trusted login token and a current trusted login ID issued to the second server. The current trusted login ID can be issued by the first server to the second server that provides service to the originating application. When it is determined that the temporary trusted login token and the service ID of the service page meet the first mapping relationship and the second mapping relationship, the temporary trusted login token can have the service authorization to access the corresponding service page. Otherwise, the temporary trusted login token does not have the service authorization to access the service page.

For example, assume that the mapping relationship established by the first server for the temporary trusted login token is based on Table 1 as described in the description of FIG. 3. The temporary trusted login token in the page access request received by the first server is x6478, the service ID of the service page to be accessed is 103, and the current trusted login ID of the second server is 3450. Based on Table 1, the temporary trusted login token in the page access request and the service ID satisfy the first mapping relationship, but the temporary trusted login token and the current trusted login ID do not satisfy the second mapping relationship (the temporary trusted login token x6478 corresponds to a current trusted login ID 3451, rather than 3450 according to the second mapping relationship). The temporary trusted login token x6478 can then be determined as an illegitimate token which may be usurped or has expired. As a result, the first server can reject the current service access request. From 420, method 400 proceeds to 430.

At 430, trusted login from the originating application to the first server is allowed if the temporary trusted login token is determined to have the service authorization to access the service page served by the first server. Otherwise, trusted login to the first server is rejected.

In some cases, trusted login can be performed to the first server instead of a target application with the service page served by the first server. In other words, when performing trusted login, the service page provided by the target application served by the first server can be forwarded to the originating application, so the user does not need to be redirected to the UI of the target application for trusted login. As such, the trusted login for accessing services is more efficiently performed and user experience can be improved. For example, if an originating application served by a second server is a map application, and a target application with the service page served by a first server is a payment application, a user using the map application can click an access entrance (for example, a hyperlink) on the originating application to request access to a service page of the payment application. The first server serving the payment application can verify and complete the trusted login of the user and return the service page to the map application without redirecting the user to the payment application.

In some cases, the service page served by the first server can be loaded to the originating application in an embedded manner. A service process and service presentation of the service page can be implemented by using an HTML5 (H5) page. A H5 page can be a page implemented by using the fifth revised language of the hypertext markup language. As such, the software and system development for the target application and the first server can be reduced. The first server only needs to complete the trusted login and return the service page to the originating application, hence can distribute the service page to more applications and user computing devices.

After trusted login is completed, the first server can save a user ID in the service page. For example, a control over a "session" between the originating application and the service page can be recorded based on the trusted login result, and an ID of a user of the originating application can be written into the "session" to indicate that the trusted login is successful. In some cases, within a predetermined time period, the originating application does not need to log in to the first server after a successful trusted login. The service page can directly respond to service operations performed through the originating application within the predetermined time period.

Figure 5:
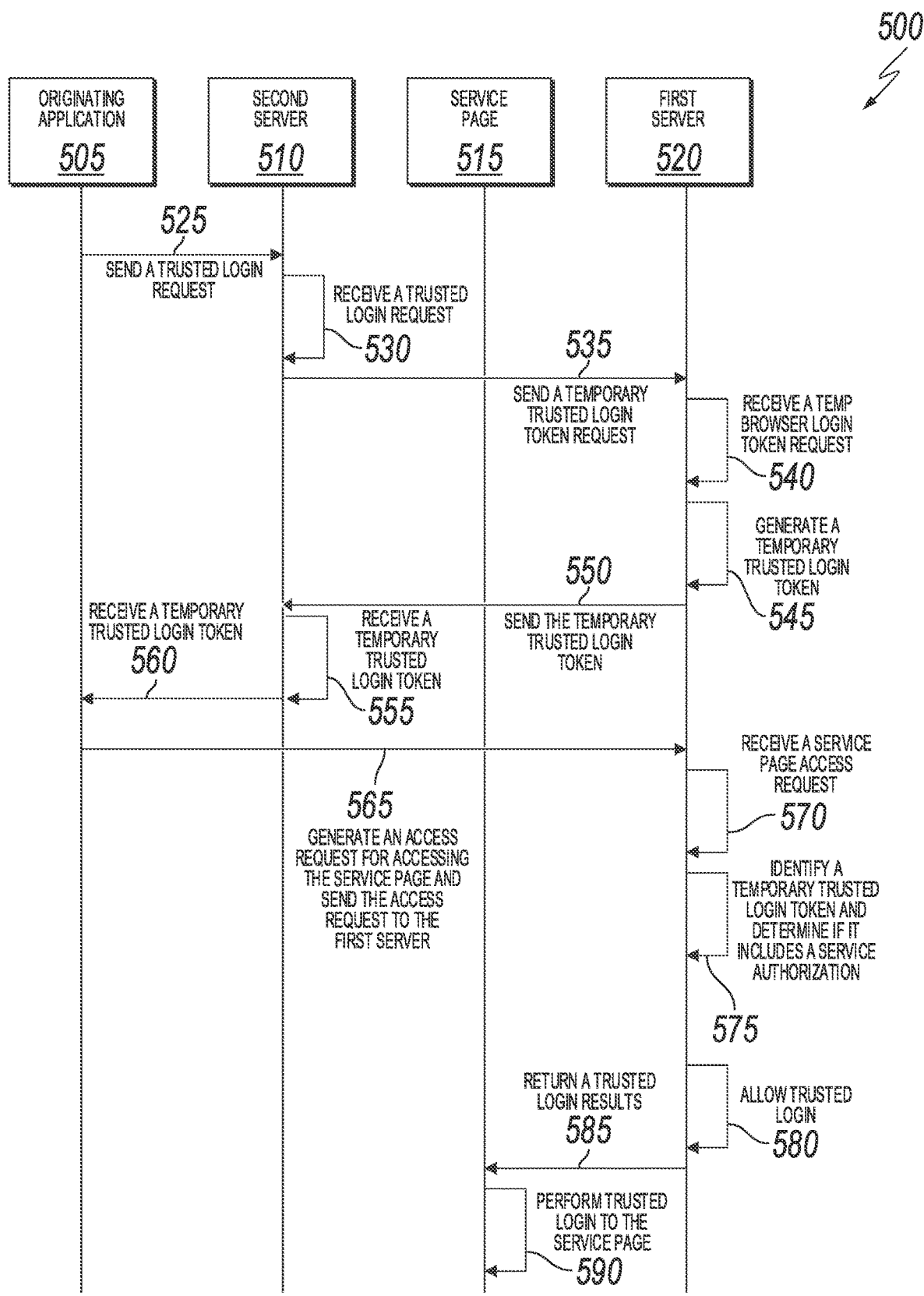
FIG. 5 is a swim lane diagram illustrating an example of a trusted login method 500, according to an implementation of the present disclosure.

FIG. 5 is a swim lane diagram illustrating an example of a trusted login method 500, according to an implementation of the present disclosure. The trusted login method 500 is performed by an originating application 505, a second server 510, a service page 515 of a target application, and a first server 520 that provides service to the service page 515 of the target application.

At 525, a trusted login request is sent from an originating application 505 to a second server 510 serving the originating application 505 for logging to a service page 515, served by a first server 520. In some cases, the trusted login request to a second server 510 is sent in response to a user performing an operation on an access entrance on a UI of the originating application 505. The access entrance can be a hyperlink embedded in the UI. The service page 515 can be included in a target application for services provided by the first server 520.

The trusted login request can include a service identification (ID) of the service page 515. The service ID can be unique to the service page 515 to be accessed from the originating application 505. The trusted login request can also include a user ID and password. The user ID and password can be used to log in to the second server 510, or allow the second server 510 to authenticate the user's identity for using the originating application 505. When the user successfully logs in from the originating application 505 to the second server 510 using the user ID and password, or the user's identity is otherwise verified by the second server 510, the second server 510 can send a temporary trusted login token to the originating application 505. From 525, method 500 proceeds to 530.

At 530, the trusted login request is received by a second server 510 from an originating application 505. From 530, method 500 proceeds to 535.

At 535, a temporary trusted login token request based on the received trusted login request is sent to a first server 520. The temporary trusted login token request can be generated based on the trusted login request and a server ID of the second server 510. The first server 520 can determine, based on the server ID, whether the second server 510 is a trusted server. If the second server 510 is a trusted server, the first server 520 can parse the trusted login request included in the token acquisition request, and send a temporary login token to the second server 510. If the second server 510 is not a trusted server, the first server 520 can reject the token acquisition request.

The temporary trusted login token request can also be generated based on the trusted login request and a current trusted login ID issued by the first server 520. The current trusted login ID can be a certificate used by the second server 510 to obtain a temporary trusted login token. If the current trusted login ID is legitimate, the first server 520 can parse the trusted login request in the temporary trusted login token request to determine whether to send the temporary login token. If the current trusted login ID is not legitimate, the first server 520 can reject to send the temporary login token to the second server 510.

The current trusted login ID can be a trusted login number. The trusted login number can be issued by the first server 520 to the trusted second server 510. The trusted login number can be a permanent number, and can be valid within a predetermined time period. In some cases, the trusted login number can also be updated dynamically. The first server 520 can update the trusted login number periodically and then send to the second server 510.

In some cases, the second server 510 can directly send the temporary trusted login token request to the first server 520 after receiving a trusted login request from the originating application 505. In some other cases, the second server 510 can parse the trusted login request to determine whether the trusted login request is legitimate (for example, determine whether the originating application 505 has been used to successfully log in to the second server 510, or the first server 520 providing the service page 515 has e-signed an agreement with the second server 510). If the trusted login request is determined to be legitimate, the second server 510 then sends the temporary trusted login token request to the first server 520. If the trusted login request is determined to be not legitimate, the second server 510 can return a failure message to the originating application 505. From 535, method 500 proceeds to 540.

At 540, the temporary trusted login token request is received by the first server 520 from the second server 510. In some cases, after receiving the token acquisition request, the first server 520 can generate a temporary trusted login token based on the temporary trusted login token request and set a service authorization of the temporary trusted login token that determines one or more service pages to which trusted login can be allowed from the originating application 505. In some cases, the first server 520 can first determine whether the originating application 505 is a trusted client application based on the token acquisition request, before generating the temporary trusted login token.

In some cases, the first server 520 can determine whether the originating application 505 is a trusted client application based on whether the temporary trusted login token request includes a current trusted login ID issued by the first server 520 to the second server 510. If so, it is determined that the originating application 505 is a trusted client application. Otherwise, it is determined that the originating application 505 is not a trusted client application.

In some cases, the first server 520 can determine whether the originating application 505 is a trusted client application based on user ID mapping between the second server 510 and the first server 520. For example, a first server 520 can identify a user ID of the originating application 505 in the token acquisition request, and determine whether a corresponding user ID exists in the first server 520. If a corresponding user ID exists, it is determined that the originating application 505 is a trusted client application. Otherwise, it is determined that the originating application 505 is not a trusted client application. If it is determined that the originating application 505 is not a trusted client application, the first server 520 can return a failure message to the second server 510. From 540, method 500 proceeds to 545.

At 545, the temporary trusted login token is generated based on the temporary trusted login token request and a service authorization is set for the temporary trusted login token that determines one or more service pages to which trusted login from the originating application 505 is allowed. The service authorization can be set for one or more service pages. The setting of the service authorization can include establishing at least one of a first mapping relationship or a second mapping relationship. The first mapping relationship can be a mapping relationship between the temporary trusted login token and one or more service IDs corresponding to the one or more allowed service pages. The second mapping relationship can be a mapping relationship between the temporary trusted login token and a current trusted login ID issued to the second server 510. Because the current trusted login ID is associated with a server, by using the second mapping relationship, the temporary trusted login token can be directed to the second server 510. As such, the temporary trusted login token can be protected from unauthorized access from other servers.

In some cases, the temporary trusted login token can be generated based on specific rules for authenticity check. In some cases, a time limit can be set for the temporary trusted login token, such that the temporary trusted login token expires after the time limit and sends the temporary trusted login token request to a first server 520. From 545, method 500 proceeds to 550.

At 550, the temporary trusted login token can be sent to the originating application 505 by using the second server 510. From 550, method 500 proceeds to 555.

At 555, the temporary trusted login token is received from the first server 520 and forwarded to the originating application 505. From 555, method 500 proceeds to 560.

At 560, the temporary trusted login token sent by the second server 510 is received by the originating application 505. The temporary trusted login token can be a certificate for the originating application 505 to visit the first server 520 and access the service page 515 served by the first server 520. A service authorization for accessing one or more service pages can be written in the temporary trusted login token. The originating application 505 can be restricted from accessing service pages not allowed by the service authorization of the temporary trusted login token. The temporary trusted login token can be generated by the first server 520 in response to a temporary trusted login token request from the second server 510 and is sent back to the second server 510. The second server 510 can then forward the temporary trusted login token to the originating application 505. From 560, method 500 proceeds to 565.

At 565, an access request for accessing the service page 515 provided by the first server 520 is generated based on the received temporary trusted login token and sent to the first server 520. During generation of the access request for accessing the service page 515, the access request can be generated based on the temporary trusted login token and the service ID. In some cases, the access request can also be generated based on the user ID. If the access request includes the user ID, the first server 520 can search for, or generate, a user ID for user account login to the service page 515 based on a predetermined user ID mapping relationship between the second server 510 and the first server 520.

The originating application 505 can then wait for the first server 520 to return a service page 515 to the UI of the originating application 505. Upon receiving the service page 515, the originating application 505 can perform service provided by the service page 515. Because the service pages that can be accessed from the originating application 505 are determined by the service authorization of the temporary trusted login token, the access permission to services provided by the service page 515 can be customized to allow enhanced security. From 565, method 500 proceeds to 570.

At 570, a service page 515 access request sent from the originating application 505 is received by the first server 520. From 570, method 500 proceeds to 575.

At 575, the temporary trusted login token is identified from the service page 515 access request, and whether the temporary trusted login token includes a service authorization to access the service page 515 is determined. In some cases, in order to improve information feedback efficiency of the first server 520, before determining whether the temporary trusted login token includes the service authorization, the first server 520 can determine whether the temporary trusted login token is legitimate or unexpired, in order to improve information feedback efficiency of the first server 520. If it is determined that the temporary trusted login token is not legitimate or has expired, the service page 515 access request can be rejected by the first server 520. If it is determined that the temporary trusted login token is legitimate and has not expired, the determination on the service authorization is then performed. From 575, method 500 proceeds to 580.

At 580, trusted login from the originating application 505 to the first server 520 is allowed if the temporary trusted login token is determined to have the service authorization to access the service page 515 served by the first server 520. Otherwise, trusted login to the first server 520 is rejected. From 580, method 500 proceeds to 585.

At 585, a trusted login result is returned to the service page. From 585, method 500 proceeds to 590. From 585, method 500 proceeds to 590.

At 590, trusted login to the service page is performed. After 590, method 500 ends.

By issuing a temporary trusted login token, a first server 520 can use a service authorization to provide limited access from an originating application 505 to a service page 515 of a target application without performing additional login steps. The limited access allowed by the service authorization can protect unauthorized service pages from being accessed using trusted login, which improves data security. By returning the service page to the originating application 505 after trusted login, a trusted user does not need to be redirected to the target application to perform the service, such that the user's experience can be further improved.

Figure 6:
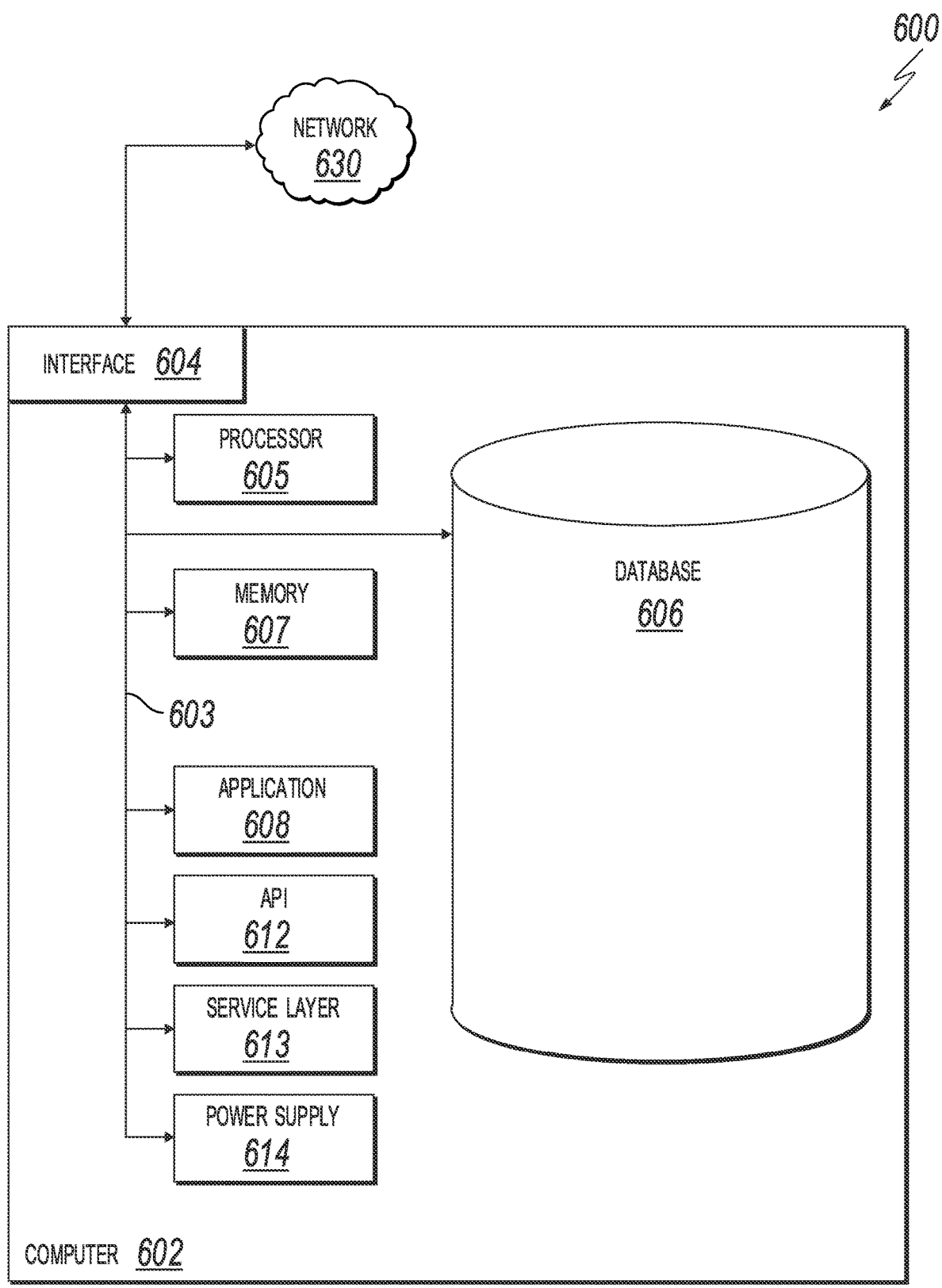
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 602 can include an input device, such as a keypad, keyboard, touch screen, another input device, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as a client, network component, a server, a database or another persistency, another role, or a combination of roles for performing the subject matter described in the present disclosure. The illustrated Computer 602 is communicably coupled with a Network 630. In some implementations, one or more components of the Computer 602 can be configured to operate within an environment, including cloud-computing-based, local, global, another environment, or a combination of environments.

At a high level, the Computer 602 is an electronic computing device operable to receive, transmit, process, store, or manage data and information associated with the described subject matter. According to some implementations, the Computer 602 can also include or be communicably coupled with a server, including an application server, e-mail server, web server, caching server, streaming data server, another server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory, conventional, or another type of database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: receiving a temporary trusted login token request for accessing a service page from an originating application; generating a temporary trusted login token based on the temporary trusted login token request, wherein the temporary trusted login token includes a service authorization that identifies one or more service pages that can be accessed through temporary trusted login; sending the temporary trusted login token to the originating application; receiving a service page access request for accessing the service page generated based on the temporary trusted login token; identifying the temporary trusted login token including the service authorization from the service page access request; determining if the service page is included in the one or more service pages that are identified by the service authorization; and allowing trusted login to the service page from the originating application if the service page is included in the one or more service pages.

The foregoing and other described implementations can each, optionally, include one or more of the following features:

A first feature, combinable with any of the following features, wherein the temporary trusted login token identifies a first mapping relationship between an identification of the service page and the temporary trusted login token, and a second mapping relationship between an identification of a current trusted login identification issued by a server that serves the service page and the temporary trusted login token.

A second feature, combinable with any of the previous or following features, wherein the service authorization identifies the service page when the temporary trusted login token satisfies the first mapping relationship and the second mapping relationship.

A third feature, combinable with any of the previous or following features, further comprising sending the service page to the originating application after determining the service page is included in the one or more service pages that are identified by the service authorization.

A fourth feature, combinable with any of the previous or following features, wherein the temporary trusted login token is valid within a predetermined time period after being generated and is updated periodically.

In a second implementation, a non-transitory, computer-readable medium storing one or more instructions executable by a computer system to perform operations comprising: receiving a temporary trusted login token request for accessing a service page from an originating application; generating a temporary trusted login token based on the temporary trusted login token request, wherein the temporary trusted login token includes a service authorization that identifies one or more service pages that can be accessed through temporary trusted login; sending the temporary trusted login token to the originating application; receiving a service page access request for accessing the service page generated based on the temporary trusted login token; identifying the temporary trusted login token including the service authorization from the service page access request; determining if the service page is included in the one or more service pages that are identified by the service authorization; and allowing trusted login to the service page from the originating application if the service page is included in the one or more service pages.

The foregoing and other described implementations can each, optionally, include one or more of the following features:

A first feature, combinable with any of the following features, wherein the temporary trusted login token identifies a first mapping relationship between an identification of the service page and the temporary trusted login token, and a second mapping relationship between an identification of a current trusted login identification issued by a server that serves the service page and the temporary trusted login token.

A second feature, combinable with any of the previous or following features, wherein the service authorization identifies the service page when the temporary trusted login token satisfies the first mapping relationship and the second mapping relationship.

A third feature, combinable with any of the previous or following features, further comprising sending the service page to the originating application after determining the service page is included in the one or more service pages that are identified by the service authorization.

A fourth feature, combinable with any of the previous or following features, wherein the temporary trusted login token is valid within a predetermined time period after being generated and is updated periodically.

In a third implementation, computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a temporary trusted login token request for accessing a service page from an originating application; generating a temporary trusted login token based on the temporary trusted login token request, wherein the temporary trusted login token includes a service authorization that identifies one or more service pages that can be accessed through temporary trusted login; sending the temporary trusted login token to the originating application; receiving a service page access request for accessing the service page generated based on the temporary trusted login token; identifying the temporary trusted login token including the service authorization from the service page access request; determining if the service page is included in the one or more service pages that are identified by the service authorization; and allowing trusted login to the service page from the originating application if the service page is included in the one or more service pages.

The foregoing and other described implementations can each, optionally, include one or more of the following features:

A first feature, combinable with any of the following features, wherein the temporary trusted login token identifies a first mapping relationship between an identification of the service page and the temporary trusted login token, and a second mapping relationship between an identification of a current trusted login identification issued by a server that serves the service page and the temporary trusted login token.

A second feature, combinable with any of the previous or following features, wherein the service authorization identifies the service page when the temporary trusted login token satisfies the first mapping relationship and the second mapping relationship.

A third feature, combinable with any of the previous or following features, further comprising sending the service page to the originating application after determining the service page is included in the one or more service pages that are identified by the service authorization.

A fourth feature, combinable with any of the previous or following features, wherein the temporary trusted login token is valid within a predetermined time period after being generated and is updated periodically.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a first server that provides a service page within a target application and from a second server that serves an originating application, a temporary trusted login token request for accessing the service page;
   generating, by the first server, a temporary trusted login token based on the temporary trusted login token request, wherein the temporary trusted login token includes a service authorization that identifies one or more service pages that can be accessed through temporary trusted login, the temporary trusted login token comprising a first mapping relationship between one or more service identifications corresponding to one or more allowed service pages and the temporary trusted login token, and further comprising a second mapping relationship between a current trusted login identification issued by the first server and the temporary trusted login token, wherein the first mapping relationship and the second mapping relationship are separate mapping relationships;

sending, by the first server, the temporary trusted login token to the originating application using the second server;

receiving, by the first server, a service page access request for accessing the service page generated based on the temporary trusted login token;

identifying, by the first server, the temporary trusted login token including the service authorization from the service page access request;

determining, by the first server, if the service page is included in the one or more service pages that are identified by the service authorization; and allowing, by the first server, trusted login to the service page from the originating application if the service page is included in the one or more service pages, the allowing of the trusted login comprising displaying the service page in the originating application without redirecting to the target application for the display of the service page.

2. The computer-implemented method of claim 1, wherein the service authorization identifies the service page when the temporary trusted login token satisfies the first mapping relationship and the second mapping relationship.

3. The computer-implemented method of claim 1, further comprising:
sending, by the first server, the service page to the originating application after determining the service page is included in the one or more service pages that are identified by the service authorization.

4. The computer-implemented method of claim 1, wherein the temporary trusted login token is valid within a predetermined time period after being generated and is updated periodically.

5. A non-transitory, computer-readable medium storing one or more instructions executable by a first server that provides a service page within a target application to perform operations comprising:
receiving, from a second server that serves an originating application; a temporary trusted login token request for accessing the service page;
generating a temporary trusted login token based on the temporary trusted login token request, wherein the temporary trusted login token includes a service authorization that identifies one or more service pages that can be accessed through temporary trusted login, the temporary trusted login token comprising a first mapping relationship between one or more service identifications corresponding to one or more allowed service pales and the temporary trusted login token, and further comprising a second mapping relationship between a current trusted login identification issued by the first server and the temporary trusted login token, wherein the first mapping relationship and the second mapping relationship are separate mapping relationships;
sending the temporary trusted login token to the originating application using the second server;
receiving a service page access request for accessing the service page generated based on the temporary trusted login token;
identifying the temporary trusted login token including the service authorization from the service page access request;

determining if the service page is included in the one or more service pages that are identified by the service authorization; and allowing trusted login to the service page from the originating application if the service page is included in the one or more service pages, the allowing of the trusted login comprising displaying the service page in the originating application without redirecting to the target application for the display of the service page.

6. The non-transitory, computer-readable medium of claim 5, wherein the service authorization identifies the service page when the temporary trusted login token satisfies the first mapping relationship and the second mapping relationship.

7. The non-transitory, computer-readable medium of claim 5, further comprising sending the service page to the originating application after determining the service page is included in the one or more service pages that are identified by the service authorization.

8. The non-transitory, computer-readable medium of claim 5, wherein the temporary trusted login token is valid within a predetermined time period after being generated and is updated periodically.

9. The non-transitory, computer-readable medium of claim 5, further comprising: sending, by the first server, the service page to the originating application after determining the service page is included in the one or more service pages that are identified by the service authorization.

10. A computer-implemented system, comprising:
one or more computers comprising a first server that provides a service page within a target application; and
one or more computer memory devices interoperably coupled with the one or more computers and having tangible, non-transitory, machine-readable media storing one or more instructions that, when executed by the one or more computers, perform one or more operations comprising:
receiving, from a second server that serves an originating application, a temporary trusted login token request for accessing the service page;
generating a temporary trusted login token based on the temporary trusted login token request, wherein the temporary trusted login token includes a service authorization that identifies one or more service pages that can be accessed through temporary trusted login, the temporary trusted login token comprising a first mapping relationship between one or more service identifications corresponding to one or more allowed service pages and the temporary trusted login token, and further comprising a second mapping relationship between a current trusted login identification issued by the first server and the temporary trusted login token, wherein the first mapping relationship and the second mapping relationship are separate mapping relationships;
sending the temporary trusted login token to the originating application using the second server;
receiving a service page access request or accessing the service page generated based on the temporary trusted login token;
identifying the temporary trusted login token including the service authorization from the service page access request;
determining if the service page is included in the one or more service pages that are identified by the service authorization; and allowing trusted login to the service page from the originating application if the service page is included in the one or more service pages, the allowing of the trusted login comprising displaying the service page in the originating application without redirecting to the target application for the display of the service page.

11. The computer-implemented system of claim 10, wherein the service authorization identifies the service page when the temporary trusted login token satisfies the first mapping relationship and the second mapping relationship.

12. The computer-implemented system of claim 10, further comprising sending the service page to the originating application after determining the service page is included in the one or more service pages that are identified by the service authorization.

13. The computer-implemented system of claim 10, wherein the temporary trusted login token is valid within a predetermined time period after being generated and is updated periodically.

14. The computer-implemented system of claim 10, further comprising:
sending, by the first server, the service page to the originating application after determining the service page is included in the one or more service pages that are identified by the service authorization.

* * * * *